UNITED STATES PATENT OFFICE.

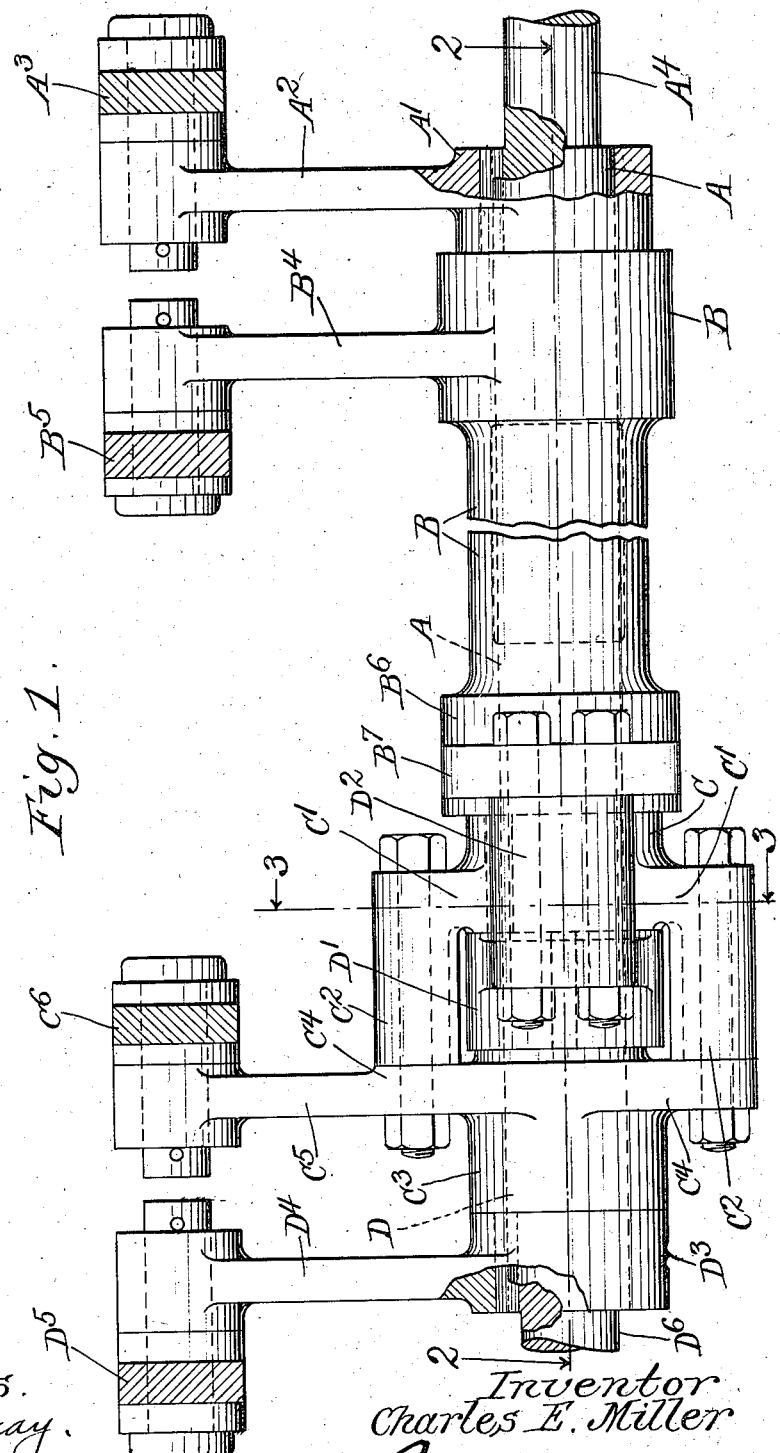

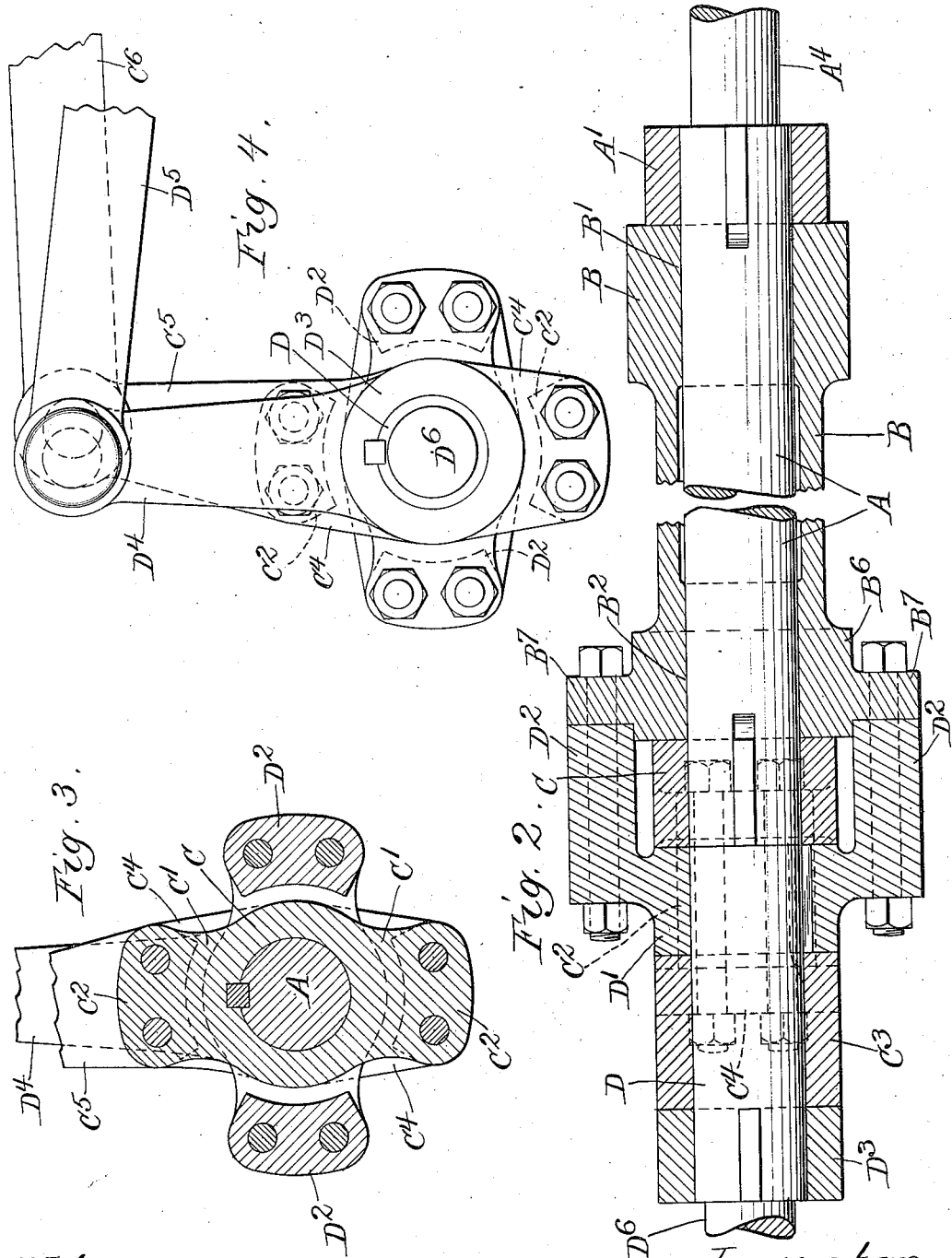

CHARLES E. MILLER, OF CHICAGO, ILLINOIS, ASSIGNOR TO THE PYLE-NATIONAL COMPANY, OF CHICAGO, ILLINOIS, A CORPORATION OF NEW JERSEY.

ROCK-SHAFT FOR VALVE-GEARS.

1,222,969.                  Specification of Letters Patent.        Patented Apr. 17, 1917.

Application filed August 4, 1916. Serial No. 113,036.

*To all whom it may concern:*

Be it known that I, CHARLES E. MILLER, a citizen of the United States, residing at Chicago, in the county of Cook and State of Illinois, have invented a certain new and useful Improvement in Rock-Shafts for Valve-Gears, of which the following is a specification.

My invention relates to rock shafts. In the form here shown it consists of two shafts concentrically arranged, each shaft being provided with a pair of lever arms, the arms so arranged that those of one shaft alternate with those of the other.

It is illustrated in the accompanying drawing, wherein—

Figure 1 is a side elevation with parts in section and parts broken away.

Fig. 2 is a section along the line 2—2 of Fig. 1.

Fig. 3 is a section along the line 3—3 of Fig. 1.

Fig. 4 is an end elevation looking toward the right on Fig. 1.

Like parts are indicated by like characters in both drawings.

A is a solid shaft, keyed to the adjacent open end thereof is a hub $A^1$. Projecting from this hub is a lever $A^2$ and on this lever is pivotally mounted the end of a connecting link $A^3$. The end of the shaft is reduced at $A^4$ to form a bearing surface.

B is an elongated hollow pipe or sleeve. It has a bearing on shaft A at $B^1$ and at $B^2$. The intermediate portion of the sleeve is cut away so as to be out of contact with the shaft. $B^4$ is an arm projecting outwardly from the sleeve B adjacent to the arm $A^2$ and provided with connecting link $B^5$ pivoted thereto. The other end of the pipe or sleeve B terminates in a collar $B^6$ having flanges $B^7$ projecting outwardly on diametrically opposed sides thereof.

C is the hub of the coupling keyed to the end of the shaft A where it projects beyond the sleeve B. This coupling has flanges $C^1$ on opposed sides and these flanges carry overhanging arms $C^2$ projecting parallel with the shaft and projecting outwardly beyond the end thereof. $C^3$ is a hub concentric with the coupling C and having flanges $C^4$ bolted to the ends of the arms $C^2$ and arm $C^5$ projects outwardly from one of said flanges and carries pivotally mounted on its end the connecting link $C^6$.

D is a stub shaft in rotatable engagement with the hub $C^3$ and abutting against the end of the shaft A. $D^1$ is a clutch hub identical with the clutch hub C. It, however, is keyed to the end of the shaft D and its overhanging arms $D^2$ are bolted to the flanges $B^7$ so that the stub shaft is operatively rigidly connected to the sleeve B. The two couplings noted while concentric are placed about the axis of the shafts 90° one from another. $D^3$ is a hub keyed to the outer end of the shaft D. It has an arm $D^4$ projecting therefrom and carrying a connecting link $D^5$ pivoted thereto. The end of the shaft D terminates in a rotative bearing portion $D^6$.

The form, size, proportion and arrangement of these several parts could be greatly altered without departing from the spirit of my invention and I wish, therefore, to have these drawings taken as in a sense diagrammatic, although they do in a sense show an operative structure.

The use and operation of my invention are as follows:—

In the form illustrated the rock shaft and coupling are adapted to be applied to the operation of locomotive valve gears. The lever arm $D^4$ is connected to an engine which engine imparts motion to it and through it and the rock shaft D to the arm $B^4$. A similar connection is made between the engine on the right of the locomotive frame and the arm $A^2$ and through it and the shaft A to the arm $C^5$. If we assume that the arm $D^4$ communicates the lap and lead motion to the valve on the left side of the locomotive, the arm $B^4$ will communicate travel motion to the valve on the right side of the locomotive and similarly if the arm $A^2$ is connected to the engine on the right of the locomotive, it communicates the lap and lead motion to the valve on the right of the locomotive and through the rock shaft A and the lever arm $C^4$ it communicates travel motion to the valve on the left of the locomotive.

These several connections and arrangement of parts are, of course, not necessary to be shown here and I have only suggested this form of use of the device to illustrate or suggest its practical application for a particular purpose. Such a rock shaft arrangement as I have here illustrated in its essential particulars might be employed for a variety of uses.

The combination of a hollow shaft with a solid shaft inside working on a common axis with the rock arms and their connections all concentric results in an arrangement which is rigid and durable and which takes up a minimum room. The shafts as they oscillate about their common axis in different directions make of necessity but a slight angular excursion and thus the parts can be rigid and strong because no provision need be made for any extreme angular movement between the shafts.

I claim:—

1. A rock shaft device comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft.

2. A rock shaft device comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft, and rock arms mounted on the adjacent outside ends of the main and hollow shaft and rock arms mounted on the hub and on adjacent outside end of the stub shaft.

3. A rock shaft device comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft, said couplings being both identical but in reversed position to permit a relative angular movement of the two units containing them.

4. A rock shaft device, comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft and rock arms mounted on the adjacent outside ends of the main and hollow shaft and rock arms mounted on the hub and on adjacent outside end of the stub shaft, said couplings being both identical but in reversed position to permit a relative angular movement of the two units containing them.

5. A rock shaft device comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft, the extreme outside ends of the stub and main shafts being provided with bearing portions extending beyond the rock arms.

6. A rock shaft device comprising a main shaft and a stub shaft arranged end to end, a hollow shaft rotatably mounted on the main shaft, a coupling interposed between the adjacent ends of the hollow and stub shafts, a hub rotatably mounted on the stub shaft and a coupling between it and the adjacent end of the main shaft, and rock arms mounted on the adjacent outside ends of the main and hollow shaft and rock arms mounted on the hub and on adjacent outside end of the stub shaft the extreme outside ends of the stub and main shafts being provided with bearing portions extending beyond the rock arms.

7. A rock shaft device comprising a main shaft, a coupling on one end thereof having overhanging arms out of line with the shaft extending and projecting beyond its end, a hollow shaft surrounding the main shaft and abutting at one end upon said coupling, a rock arm at the opposed end of the hollow shaft, a rock arm on the main shaft adjacent to such rock arm on the hollow shaft, a stub end shaft in line with the main shaft, a coupling on the end thereof adjacent to the main shaft identical with the coupling on the main shaft and projecting over the end of the main shaft, said coupling being in engagement with the end of the hollow shaft, a hub rotatably mounted on the stub shaft in engagement with the coupling on the main shaft, a rock arm on the said hub and a rock arm on the stub end shaft adjacent to said rock arm.

In testimony whereof, I affix my signature in the presence of two witnesses this 1st day of August, 1916.

CHARLES E. MILLER.

Witnesses:
 MINNIE M. LINDENAU,
 ESTHER VAN FRANK.